United States Patent Office 2,767,508
Patented Oct. 23, 1956

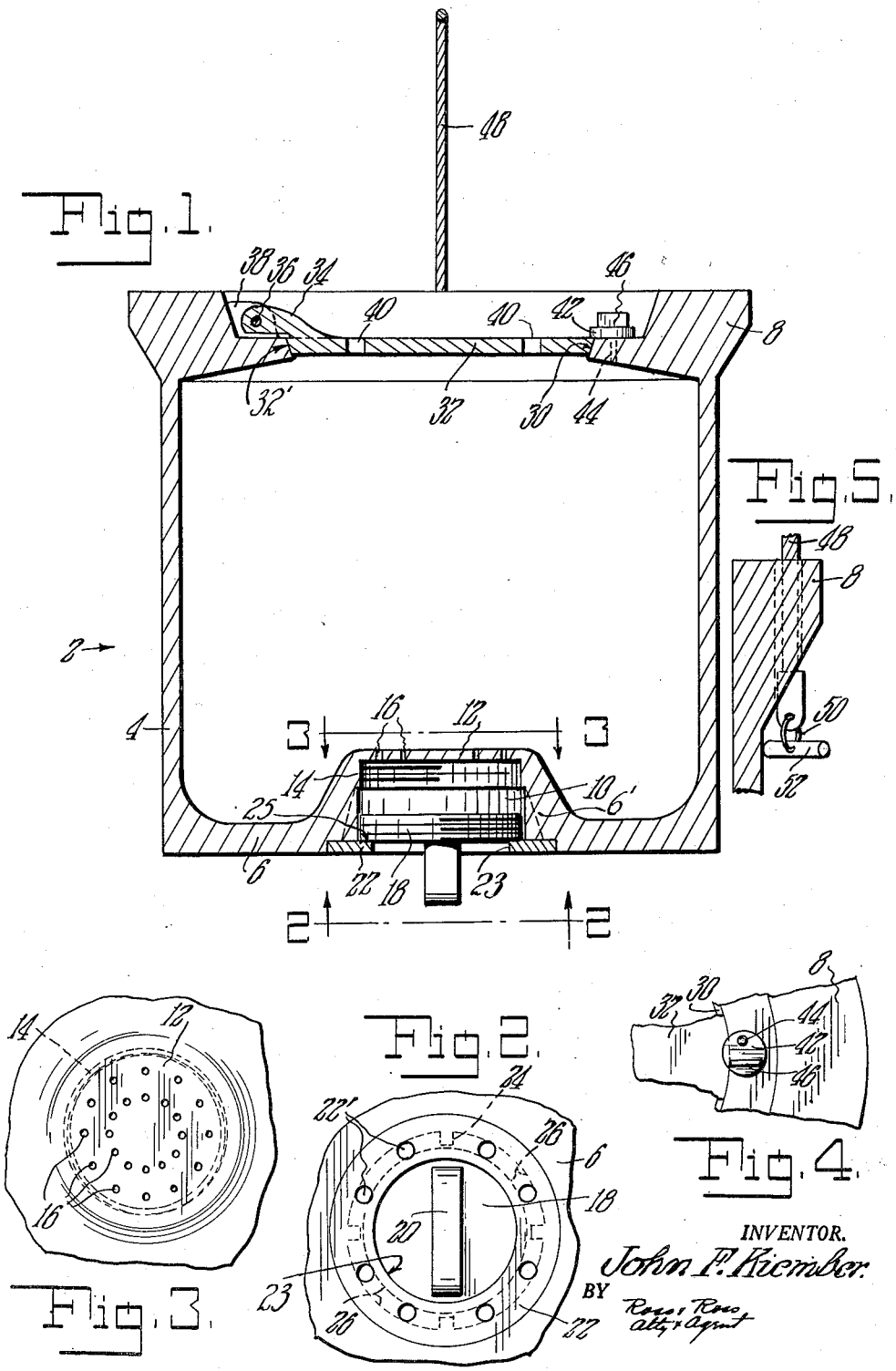

2,767,508

BAIT PAIL

John F. Kiember, Holyoke, Mass.

Application February 11, 1955, Serial No. 487,538

1 Claim. (Cl. 43—56)

This invention relates to improvements in a fish bait pail.

The principal object of the invention is directed to the provision of a pail for fish bait such as live minnows or the like, and is adapted to keep bait fresh and alive.

According to one novel feature of the invention the pail is formed from plastic material such as polyethylene or the like as distinguished from metal for its buoyant characteristics. Metal pails are easily dented or damaged, are heavy and subject to corrosion and frequently develop leaks from various causes.

The pail of the invention is constructed and arranged as a watertight container, except for vent means and is adapted for transporting bait and to serve as a buoyant floatable container having means to admit fresh water for its beneficial effects.

All of the above cited objects I accomplish by means of such structure and relative arrangement of parts thereof, as will fully appear by a perusal of the description below and by various specific features which will be hereinafter set forth.

To these above and other ends and with the foregoing and various other and ancillary features and advantages and objects of my invention as will become more readily apparent as the description proceeds, my invention consists in certain features of novelty, in a mode of operation, and in the combination, organization, and arrangement of parts as will be hereinafter more particularly pointed out in the claim hereunto annexed and more fully described and referred to in conjunction with the accompanying drawings wherein:

Fig. 1 is a longitudinal sectional view through a pail embodying the novel features of the invention;

Fig. 2 is an inverted plan view on the line 2—2 of Fig. 1;

Fig. 3 is a top plan view on the line 3—3 of Fig. 1;

Fig. 4 is a plan view of the retainer for the lid of the pail; and

Fig. 5 is a sectional view through the upper rim of the pail at one side thereof to show an end of the bale.

Referring now to the drawings more in detail the invention will be fully described.

A pail 2, as shown in Fig. 1, has a longitudinal side wall 4, a bottom wall 6 and a rim 8 on the upper side thereof. The pail will preferably be formed from plastic material, such as polyethylene, so as to have the desired buoyant characteristics and may be made by a molding operation as is usual with plastic objects. The rim 8 may be molded as a part of the pail or it may be a separate element suitably secured thereto to the end that an integral structure is provided.

The lower portion of the pail is provided with an upwardly extending annular side wall 6' forming a recess or chamber 10 having a top wall 12. The upper portion of the chamber is provided with a screw thread 14 and the top wall 12 is provided with plural ports or openings 16.

A plug 18 which may be formed from plastic material is screw threaded as shown and is provided with a manually engageable portion 20 for screwing the plug into and out of the screw thread 14 of the chamber to close and open the ports 16.

A retainer 22 extends around the chamber 10 and has a central opening 23 and an inner edge portion therearound providing a ledge 25 to prevent displacement of the plug from the chamber. Ribs 24 in the chamber more or less guide the plug 18 axially and spaces between the ribs provide water passageways 26 into said chamber.

The ring 22 is provided with ports or openings 22' leading into the passageways 26.

The plug 18 is shown in its open position for the flow of water from the pail or for the entrance of water thereinto were the pail floating in water. By screwing the plug into the screw thread 14 the openings 16 are sealed or closed.

The rim 8 is provided with an inclined seat 30 and a lid or cover 32 has a peripheral edge 32' which is complemental to the seat 30 and an ear or lug 34 hingedly connected at 36 to ears 38 of the rim. Said lid is provided with openings 40 therethrough and a lock 42 is pivoted off center to the rim as at 44. The lock 42 is provided with a manually engageable part 46 whereby said lock may be turned from and to the lid locking position shown.

A bale 48 is provided which may be made from flexible cord or the like. Opposite ends of the bale extend through the rim 8 at opposite ends thereof, as shown in Fig. 5. Rings or the like such as 50 in the opposite ends of the bale 48 are in engagement with members 52, as shown. The construction is such that the bale may be grasped or the members 52 may be grasped for manipulating the pail.

From the foregoing it will be observed that the pail as made from polyethylene or the like will have buoyancy which is not the case with metal and that the possibility of leaks caused by dents and corrosion is obviated.

The novel valve means formed by the plug in the chamber makes it possible to close or open the openings or ports 16. The lid is readily swingable between its open and closed positions and is held closed by the lock means. The lid provided with openings and the ring 22, top wall 12 and parts provided with ports and passageways make possible circulation of water in and out of the pail.

The invention may be embodied in other specific forms without departing from the essential characteristics thereof. Hence, the present embodiment is therefore to be considered in all respects merely as being illustrative and not as being restrictive, the scope of the invention being indicated by the appended claim rather than by the foregoing description, and all modifications and variation as fall within the meaning and purview and range of equivalency of the appended claim are therefore intended to be embraced therein.

What it is desired to claim and secure by Letters Patent of the United States is:

A pail construction for live bait formed from polyethylene or the like for circulation of water therein comprising, an elongated unitary container having a bottom wall and a side wall extending upwardly therefrom provided at the upper end thereof with an annular rim extending inwardly thereof and forming a central opening, said bottom wall being formed to provide an upwardly extending circular chamber having an annular side wall and an apertured upper wall, an annular ring secured to said bottom wall and having an inner edge portion extending around a central opening thereof and inwardly around the lower side of said chamber providing a ledge, a closure plug movable up and down in said chamber adapted in lower open position thereof to rest on said ledge and being provided with a manually engageable stem extending through the central opening of said ring, said plug and inner side of said annular side wall arranged to provide a space therebetween in lower open position of said plug, the inner side of said annular side wall of the chamber adjacent the upper wall thereof and said plug being provided with engageable screw threads for interengagement in upper position of the plug adjacent said upper wall to overlie the apertures therein, said rim being provided with a downwardly converging seat around said first mentioned central opening, a cover having a peripherical edge complemental to said seat, hinge connections between said rim and cover for swinging of the cover between closed position on said seat and an open position away therefrom, and means to releasably lock said cover in closed position.

References Cited in the file of this patent
UNITED STATES PATENTS

| Number | Name | Date |
|---|---|---|
| 170,093 | Landon | Nov. 16, 1875 |
| 604,846 | Shay | May 31, 1898 |
| 913,379 | Hart | Feb. 23, 1909 |
| 1,197,242 | Thompson | Sept. 5, 1916 |
| 1,327,708 | Guy | Jan. 13, 1920 |
| 2,159,718 | Spiner | May 23, 1939 |
| 2,518,581 | Tucker | Aug. 15, 1950 |
| 2,688,817 | Brune | Sept. 14, 1954 |